US008404210B2

(12) United States Patent
Hussam

(10) Patent No.: US 8,404,210 B2
(45) Date of Patent: **\*Mar. 26, 2013**

(54) IRON COMPOSITION BASED WATER FILTRATION SYSTEM FOR THE REMOVAL OF CHEMICAL SPECIES CONTAINING ARSENIC AND OTHER METAL CATIONS AND ANIONS

(75) Inventor: Abul Hussam, Centreville, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 491 days.

This patent is subject to a terminal disclaimer.

(21) Appl. No.: 12/524,906

(22) PCT Filed: Jan. 29, 2008

(86) PCT No.: PCT/US2008/052291
§ 371 (c)(1),
(2), (4) Date: Jul. 29, 2009

(87) PCT Pub. No.: WO2008/127757
PCT Pub. Date: Oct. 23, 2008

(65) Prior Publication Data
US 2010/0034729 A1    Feb. 11, 2010

Related U.S. Application Data

(60) Provisional application No. 60/968,663, filed on Aug. 29, 2007, provisional application No. 60/913,120, filed on Apr. 20, 2007, provisional application No. 60/886,989, filed on Jan. 29, 2007.

(51) Int. Cl.
*C01B 5/00* (2006.01)

(52) U.S. Cl. ............... 423/580.1; 252/182.33; 210/669; 210/767; 210/508; 210/601; 210/617; 210/903; 210/631; 210/913; 210/914; 210/909

(58) Field of Classification Search ...................... None
See application file for complete search history.

(56) References Cited

U.S. PATENT DOCUMENTS

| | | | | |
|---|---|---|---|---|
| 3,929,472 | A * | 12/1975 | Okada et al. | 420/83 |
| 6,093,328 | A * | 7/2000 | Santina | 210/679 |
| 6,194,033 | B1 * | 2/2001 | Shimizu et al. | 427/388.1 |
| 7,338,603 | B1 * | 3/2008 | McNew et al. | 210/660 |
| 2006/0021927 | A1 | 2/2006 | Bandyopadhyay et al. | |
| 2006/0249465 | A1 * | 11/2006 | Jin et al. | 210/764 |
| 2007/0017871 | A1 | 1/2007 | Reddy et al. | |
| 2007/0080115 | A1 * | 4/2007 | Sylvester | 210/688 |

FOREIGN PATENT DOCUMENTS

| | | |
|---|---|---|
| BD | 162/2002 | 8/2002 |
| BD | 1003935 | 8/2002 |

OTHER PUBLICATIONS

Sakashita (JP 2006-124796, abstract).*

* cited by examiner

*Primary Examiner* — Melvin C Mayes
*Assistant Examiner* — Smita Patel
(74) *Attorney, Agent, or Firm* — David Yee

(57) ABSTRACT

An iron composition having a plurality of elemental components is disclosed. The major component is an iron component of at least about 68% to about 92% iron by weight. Other components by weight include manganese; cerium; carbon; phosphorous; sulfur; aluminum; silicon; chromium; copper; and zinc. Combined with layers of sand, brick chips and/or charcoal, the iron composition can be used to create a water filter for filtering inorganic arsenic species and soluble metal ions out of water. To enhance hydrous ferric oxide complexation and precipitation, the iron composition may be treated with food grade acids or a water mixture.

1 Claim, 16 Drawing Sheets

IRON COMPOSITION BASED WATER FILTRATION SYSTEM FOR THE REMOVAL OF CHEMICAL SPECIES CONTAINING ARSENIC AND OTHER METAL CATIONS AND ANIONS

CROSS REFERENCE TO RELATED APPLICATIONS

The present application claims the benefit of provisional patent application Ser. No. 60/886,989 to Hussam, filed on Jan. 29, 2007, entitled "Arsenic Water Filter," provisional patent application Ser. No. 60/913,120 to Hussam, filed on Apr. 20, 2007, also entitled "Arsenic Water Filter," and provisional patent application Ser. No. 60/968,663 to Hussam, filed on Aug. 29, 2007, also entitled "Arsenic Water Filter," which are all hereby incorporated by reference.

BACKGROUND OF THE INVENTION

Arsenic poisoning in drinking water is identified as one of earth's worst natural disaster. For example, in Bangladesh, an estimated 77-95 million people are drinking groundwater containing at least about 50 µg/L (or about 0.05 mg/L) maximum contamination level (MCL) from 10 million tubewells. Prolonged drinking of such contaminated water has caused serious illnesses. These illnesses include hyperkeratosis on palms and/or feet, fatigue symptoms of arsenicosis, cancer of the bladder, skin and other organs, etc.

In groundwater, with a pH between approximately 6.5 to approximately 7.5, arsenic may be present in two oxidation states, namely, As(III) in $H_3AsO_3$ and As(V) in $H_2AsO_4^-$ and $HAsO_4^{2-}$. It is well known in the art that about 50% or more of total arsenic is present as the neutral $H_3AsO_3$ at groundwater pH. The remaining percentage (up to about 50%) is generally divided equally in two As(V) species: $H_2AsO4^-$ and $HAsO_4^{2-}$. To remove all three species without chemical pretreatment, regeneration and/or production of toxic wastes, an ideal filter is needed.

While efforts to resolve this problem have been underway for a decade, there is no readily available implementable solution on a widespread scale—both individual homes and the community. Consequently, to resolve this crisis, society needs a way to remove as much arsenic as possible from water. The ideal system should remove arsenic without degrading other water characteristics, such as taste and odor. It may also be beneficial if other minerals and elements in the water can be removed. It would also help if the ideal system is user-friendly, easy to maintain (including removal and safe disposal of contaminated residues), and sustainable over many years.

DETAILED DESCRIPTION OF THE INVENTION

The claimed invention embodies a water filter and its components. The water filter has the ability to remove toxins, such as arsenic, manganese, etc.

Briefly, one primary active material for the water filter is a composite iron matrix (CIM) (also referred to herein as "iron composition"). CIM is a mass that comprises a multitude of metal and nonmetal components. The largest component of the CIM (iron composition) is the iron component, with anywhere between at least about 68% to about 92% iron by weight.

Other components of CIM include, but not limited to, an iron component, a manganese component, a cerium component, a carbon component, a phosphorous component, a sulfur component, an aluminum component, a silicon component, a chromium component, a copper component and a zinc component.

1. CIM Manufacturing

Figure 1:
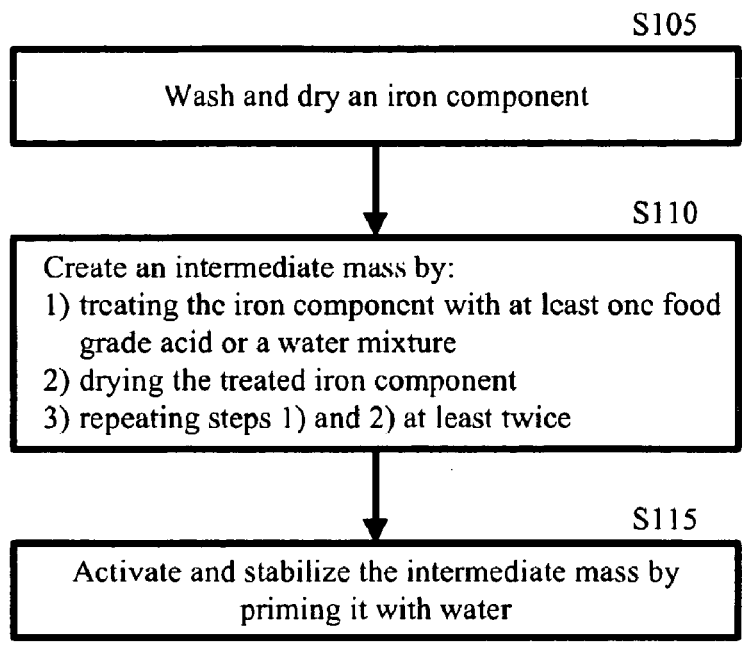
FIG. 1 shows an example of a flow diagram of a process for making a composite iron matrix.

To make CIM, as shown in FIG. 1, the overall process includes washing and drying an iron component S105; creating an intermediate mass by (a) treating the iron component with one or more food grade acids or a water mixture, (b) drying the treated iron component, and (c) repeating steps (a) and (b) at least twice S110; and activating and stabilizing the intermediate mass by priming the intermediate mass with water S115.

The iron component serves as the starting material and comprises iron as the base metal and its derivatives. Nonlimiting examples of iron and its derivatives include low carbon steel, medium carbon steel, high carbon steel, Grey (~150 to ~350 MPa), Nodular (Ferritic), Grey (~1 to ~7), cast iron, pig iron, mild steel, construction grade steel, deformed bars, Ferro-manganese (containing by weight more than about 2% carbon), Ferro-chromium (containing by weight more than about 4% carbon), etc. One or some combination of these metals may be used. Each of these metals may have a fineness modulus of ~0.05-~6.0 mm in average dimension. Furthermore, the iron component may have an iron weight of at least about 68% to about 92%.

The metals may be washed thoroughly with water and placed in a water bath S105. Generally, the length of time in the water bath may be, for example, about 72 hours.

Any source of water or water sample may be used to wash the iron component (which may be iron-based raw materials). It should be noted that throughout the specification, the terms "water" and "water sample" are used interchangeably and mean freshwater (such as tap, distilled, deionized, well water, rainwater, lake, pond, river, stream, creek, potable, etc.). Additionally, the water should be standard quality assured.

After washing, the metals may be dried S105. Drying may take place in the open for a certain amount of time (e.g., 72 hours, etc.), with a temperature ranging anywhere from ~28° C. to ~41° C. Drying may also be facilitated by applying heat (e.g., placing the iron component in an oven, heating and/or drying room, etc.).

To enhance controlled rusting, the metals may be treated (e.g., via spraying, douching, dipping, brushing, etc.) with water, a water mixture, or at least one food grade acid. The water mixture may contain a volume of water mixed with ~1%-~20% food grade acid. Food grade acid is defined to be an acid having a pH ranging about 2 to about 3.5. Examples of food grade acid include acetic acid (such as vinegar or citric acid), ascorbic acid, etc.

Food grade acid helps enhance hydrous ferric oxide formation for the complexation and precipitation of inorganic materials and/or soluble ions. Inorganic materials may include any arsenic specie. Soluble ions refer to metal and/or nonmetal ions, as well as cations and/or anions. Also, soluble ions can either be inorganic or organic.

As an alternative treatment method, instead of spraying with water or a water mixture, the above resulting material may be soaked in at least one food grade acid. Soaking should take place for ~24 hours. One of ordinary skill in the art should recognize that other food grade acid application techniques, such as dipping or immersing the resulting material in food grade acid, pouring food grade acid over the resulting material, etc., may be used.

Additionally, other percentages of food grade acid may also be applied. For instance, ~20%-~100% vinegar (or ~1%-~5% acetic acid) may be used.

The water/water mixture/food grade acid application and drying operation may be repeated several times (e.g., 3-4 times). This repetitive process of treating the metals with some food grade acid, water mixture, or water, and then drying the treated metals creates the intermediate mass (also referred to herein as "composite iron granules" (CIG)) S110. It is the CIG that is used to make CIM. Moreover, it is expected that the CIG comprises an iron component of at least about 68% to about 92% iron by weight.

Such operation can be automated by, for example, using any known means or mechanisms that allow for controlled treatment and drying. Meanwhile, the temperature may vary or be adjusted during this process. After several repetitions have been completed, the materials may be left in the open to dry.

With a uniform composition but with a different shape, CIG should be porous and lighter than the original iron component used. It is expected that CIG would have a fineness modulus of ~0.005-~6.0 mm in average dimension. Until ready for use, CIG may be stored in a dry facility or dry ventilated place.

CIG also has a high specific surface area. In particular, the specific surface area can be at least about 50 square meters per gram of oxide surface. CIG may contain metal hydroxides as one of the active surface complexing agents. Primarily, the metal hydroxide is hydrous ferric oxide mixed with hydrous manganese oxide. However, other metal hydroxides may include, for example, hydrous cerium oxide, hydrous chromium oxide, hydrous copper oxide, and hydrous zinc oxide.

After its creation, the intermediate mass may be activated and stabilized by priming it with water S115. As one embodiment of accomplishing this feat, the CIG may be placed in desired shape-forming container (e.g., a tube, earthen pitcher, plastic buckets, etc.). The CIG can either be placed by itself or between one or more layers of other components. Such components include, but are not limited to, sand, sand-charcoal, sand-brick chips and sand-gravel interface. Where multiple layers are used, each layer can be separated by a thin, porous material, such as porous nets, polyester clothes, etc.

Optionally, the CIG may first be conditioned to aid in the stabilization process prior to step S115. For example, CIG may be conditioned in a storage tank, such as a cross ventilated brick house, for about two weeks.

Water may then be reintroduced to the CIG by pumping water into the container having the CIG S115. It may be ideal for this container to have an outlet to control water flow. Generally, water flow control may be set at a rate of ~10-~100 L/hour for ~2-~7 days, or until the processed CIG in place becomes a porous solid. In one embodiment, CIG's porosity is ~8%-~20%. The density of CIG may be ~2.3 g/cm$^3$ to ~3 g/cm$^3$. After activation and stabilization, the final product is the CIM, which should now be ready for use.

The CIM (or again, iron composition) may comprise a multitude of elemental components. These components may include, but are not limited to, an iron component, a manganese component, a cerium component, a carbon component, a phosphorous component, a sulfur component, an aluminum component, a silicon component, a chromium component, a copper component and a zinc component.

The iron component may comprise at least about 68% to about 92% iron by weight.

The manganese component may comprise at least about 0.2% to about 3% manganese by weight.

The cerium component may comprise at least about 4 µg of cerium per gram of iron composition.

The carbon component may comprise at least about 1% to about 5% carbon by weight.

The phosphorous component may comprise at least about 0.05% to about 2% phosphorous by weight.

The sulfur component may comprise at least about 300 µg of sulfur per gram of iron composition to about 1000 µg of sulfur per gram of iron composition.

The aluminum component may comprise at least about 0.01% aluminum by weight.

The silicon component may comprise at least about 1% to about 2% silica by weight.

The chromium component may comprise at least about 300 µg of chromium per gram of iron composition to about 500 µg of chromium per gram of iron composition.

The copper component may comprise at least about 300 µg of copper per gram of iron composition to about 600 µg of copper per gram of iron composition.

The zinc component may comprise at least about 8 µg of zinc per gram of iron composition to about 20 µg of zinc per gram of iron composition.

Other components (e.g., barium, calcium, chloride, sodium, strontium, etc.) that may be found in the iron composition may be due in part from adsorption.

The synthetic CIM may be used in-place as the active material for removing toxic anions and cations. Alternatively, it may be removed from the container. If removed, it may be pulverized and used as the active material for removing inorganic and/or organic materials, including toxic and/or nontoxic cations and toxic and/or nontoxic anions, from water inside a filter cartridge or other container, or in a batch removal process.

II. Filtering Water using CIM

A water product may be produced by filtering any water sample through a water filter containing layered mixture of active and inactive compounds.

Active compounds may include the CIM and charcoal. Examples of charcoal include, but are not limited to, cooking wood and activated carbon. CIM can help remove toxic inorganic compounds (such as arsenic) from the water, whereas charcoal can help remove organic compounds, such as pesticide residues.

Inactive compounds may include sand and brick chips. Examples of sand include, but are not limited to, coarse river sand, processed river sand, and fine sand. Commercial filter sand of different grades may also be used. The sand, as well as brick or basaltic stone chips, can serve as a flow stabilizer and disperser. In addition to serving as a coarse particulate filter, the sand and/or brick chips can help provide mechanical stability for the water filter.

As shown in TABLE 1, the primary active material, CIM, can remove the inorganic arsenic species quantitatively through multiple possible reactions.

process does not require pretreatment of water with external oxidizing agents, such as hypochlorite, potassium permanganate, ozone, etc.

To show that water alone can also act as the primary oxidant for cast iron, a dynamic electrochemical study may be performed. Corrosion of CIM may continuously generate hydrated iron oxides with a high specific surface area.

As(V) species ($H_2AsO_4^-$ and $HAsO_4^{2-}$) may then be removed by surface-complexation reactions with surface of hydrated iron (=FeOH) (or HFO). Corrosion on CIM may aid in continuously generated hydrated iron oxides with higher specific surface areas for binding arsenic species. Experiments may show that at least about 1.2 mg of arsenic can be removed by one gram of CIM. New =FeOH may be generated in situ as more water is filtered. In addition to the removal of arsenic species, =FeOH may also remove many other toxic species, such as chromate (Cr(VI)), cadmium (Cd(II)), zinc, lead, and other heavy metal ions.

Primary reactions include:

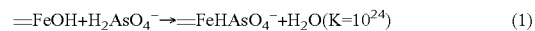

(1)

and

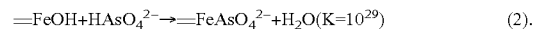

(2).

These intrinsic equilibrium constants, K, indicate very strong complexation and immobilization of inorganic arsenic

TABLE 1

Possible physicochemical reactions in different parts of the filtration process.

| Reaction Location | Reactions |
|---|---|
| Top layer: Oxidation of As(III) (Equations are balanced for reactive species only) | As(III) + $O_2^-$ → As(IV) + $H_2O_2$ <br> As(III) + $CO_3^-$ → As(IV) + $HCO_3^-$ <br> As(III)$OH^-$ → As(IV) <br> As(IV) + $O_2^-$ → As(V) + $O_2^-$ |
| Top layer: Oxidation of soluble iron Oxidation of ferrous to ferric through active oxygen species CIM hydrous ferric oxide (HFO) Fe(III) complexation and precipitation | Fe(II) + $O_2$ → $O_2^-$ + Fe(III)$OH_2^+$ <br> Fe(II) + $O_2^-$ → Fe(III) + $H_2O_2$ <br> Fe(II) + $CO_3^-$ → Fe(III) + $HCO_3^-$ <br> =FeOH + Fe(III) + 3 $H_2O$ → Fe(OH)$_3$ (s, HFO) + =FeOH + 3 $H^+$ <br> (=FeOH is surface of hydrated iron) |
| CIM - HFO surface Surface complexation and precipitation of As(V) species | =FeOH + $AsO_4^{3-}$ + 3 $H^+$ → =Fe$H_2AsO_4$ + $H_2O$ <br> =FeOH + $AsO_4^{3-}$ + 2 $H^+$ → =FeHAsO$_4^-$ + $H_2O$ <br> =FeOH + $AsO_4^{3-}$ + $H^+$ → =FeAsO$_4^{2-}$ + $H_2O$ <br> =FeOH + $AsO_4^{3-}$ → =FeOHAsO$_4^{3-}$ |
| Top two buckets: Precipitation of other metals Bulk precipitation of arsenic with soluble metal ions CIM and Sand interface Reactions with iron surface and sand can produce a porous solid structure with extremely good mechanical stability for the filter | M(III) + $HAsO_4^{2-}$ → $M_2(HAsO_4)_3$ (s), M = Fe, Al <br> M(II) + $HAsO_4^{2-}$ → M(HAsO$_4$) (s) and other arsenates <br> M = Ba, Ca, Cd, Pb, Cu, Zn and other trace metals <br> =FeOH + Si(OH)$_4$ → =FeSiO(OH)$_3$ (s) + $H_2O$ <br> =FeOH + $Si_2O_2(OH)_5^-$ + $H^+$ → =Fe$Si_2O_2(OH)_5$ (s) + $H_2O$ <br> =FeOH + $Si_2O_2(OH)_5^-$ → =Fe$Si_2O_3(OH)_4^-$ (s) + $H_2O$ <br> =FeOHAsO$_4^{3-}$ + Al(III) → =FeOHAsO$_4$Al (s) <br> =FeOHAsO$_4^{3-}$ + Fe(III) → =FeOHAsO$_4$Fe (s) <br> =FeOH•HAsO$_4^{2-}$ + Ca(II) → =FeOH•HAsO$_4$Ca (s) |

All surface species indicated by =X are solids.

Infrared spectroscopy (IRS) and extended X-ray absorption fine structure (EXAFS) show that arsenate and arsenite form bidentate, binuclear surface complexes with =FeOH (or =FeOOH or hydrous ferric oxide, HFO) as the predominant species tightly immobilized on the iron surface. Also, inorganic As(III) species may be oxidized to As(V) species by the active $O_2^-$ species, which can be produced by the oxidation of soluble Fe(II) with dissolved oxygen. Manganese (~0.2% to ~3% by weight) in CIM may act as a catalyst, and thus, catalyze oxidation of As(III) to As(V). Therefore, this species. Excess Fe(II), Fe(III), and $Ca^{2+}$, as well as other divalent cations, in groundwater are likely to enhance positive charge density of the inner Helmholtz plane of the electrical double layer. In effect, adsorption and complex formation through the double-layer charging are likely to increase. It is also likely that these excess ions specifically bind anionic arsenates to form strong surface complexes. The As(III) and As(V) removal process tends to be independent of the input arsenic concentration (i.e., a zero order reaction) to about 4000 μg/L. Input arsenic concentration includes As(III) and As(V) species.

Furthermore, cementation reactions tend to produce a porous high surface area. The insoluble spent materials appear very similar to natural HFO with a high capacity for arsenic removal.

Figure 2:
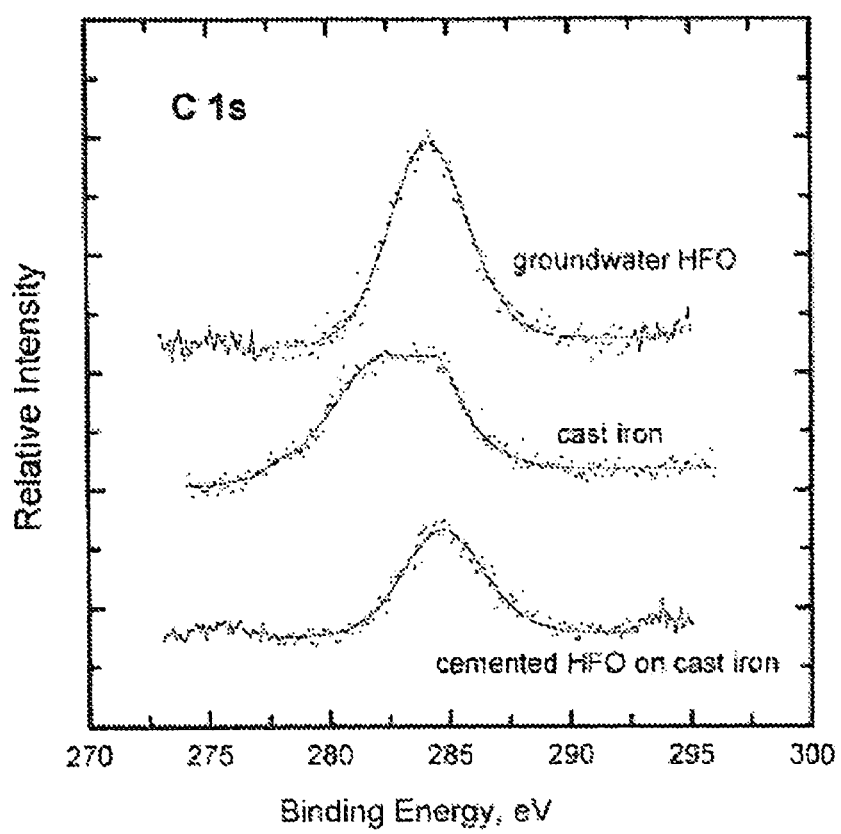
FIG. 2 shows exemplified data of the iron composition using an X-ray Photoelectron Spectroscopy.
Figure 2:
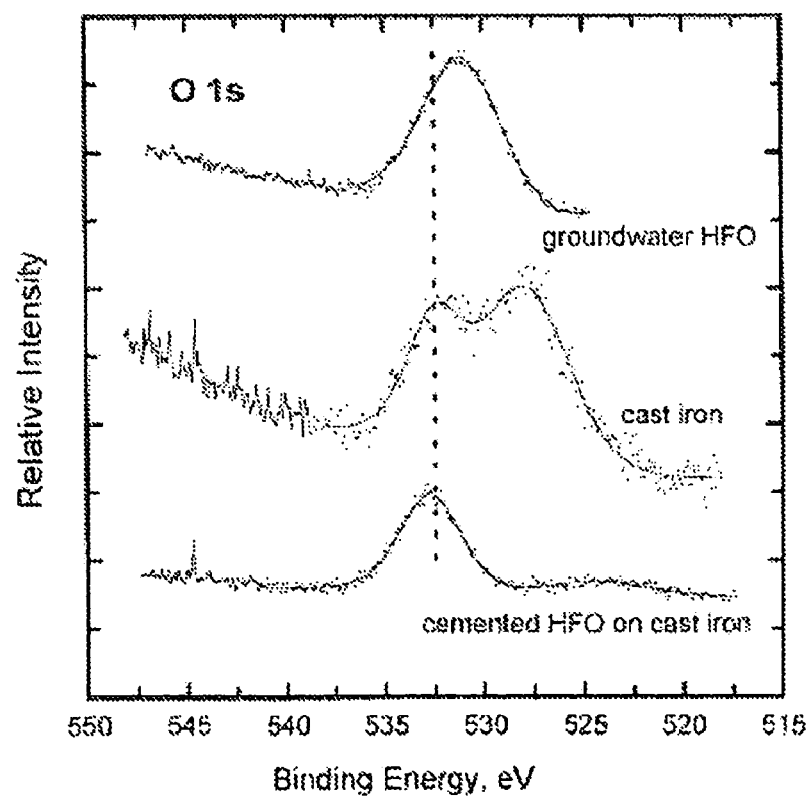

Referring to FIG. 2, an X-ray Photoelectron Spectroscopy (XPS) of the CIM is shown. The C 1s (top graph) denotes carbon, where the lower binding energy of C in the CIM is indicative of carbidic carbon. The O 1s (bottom graph) denotes metal oxides, with the dashed line denoting OH. In this latter graph, the lower binding energy state is a metal oxide.

With respect to the number of layers of active compounds, the water filter may contain at least one layer of CIM and at least one layer of charcoal. With respect to the number of layers of inactive compounds, the water filter may contain at least one layer of sand, at least one layer of brick chips, or a combination thereof.

Figure 3:
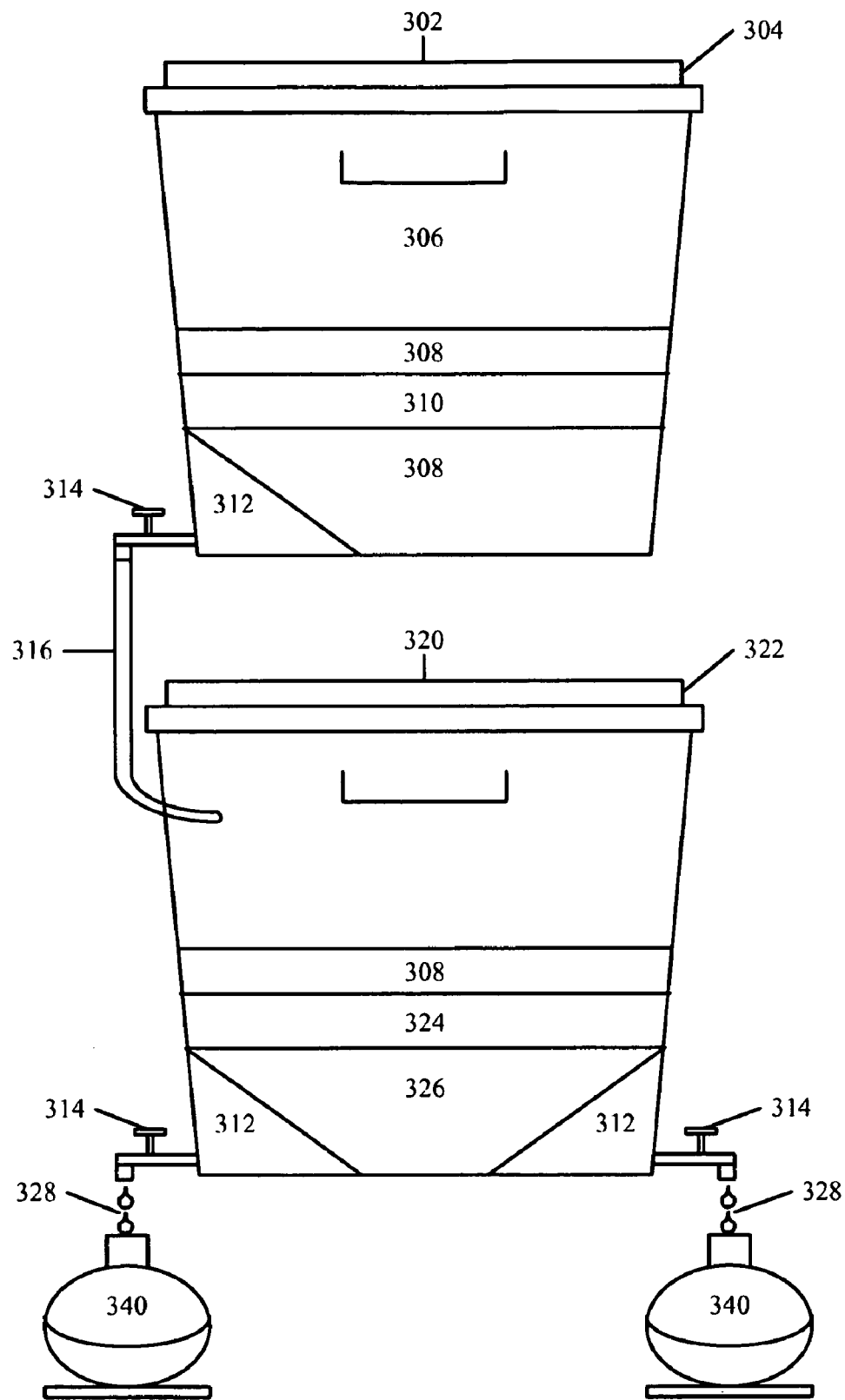
FIG. 3 shows an example of a water filter system implementing the iron composition.

Hence, as an example, water may be filtered using a water filter configuration as shown in FIG. 3 and explained in TABLE 2. This type of filtering involves two stages. In the first stage, contaminated water in a first bucket 302 with a cover 304 may pass through coarse sand 308, CIM 310 and/or brick chips 312, creating a semi-decontaminated water product. The semi decontaminated water product can pass through a tap fitted with flow control junction 314 via a tube 316 and into a second bucket 320 that also has a cover 322. In the second stage, the semi-decontaminated water product may pass through more coarse sand 308, charcoal 324, fine sand 326 and/or brick chips 312. After the second stage, the water product 328 is created. By opening the tap fitted with flow control junction 314 of the second bucket 320, the water product 328 may flow out and into a container 340. It is possible that after the second stage, the water product is also decontaminated, showing minimal to zero levels of bacteria.

TABLE 2

Materials used in filter

| Material | Function and characteristics | Brief manufacturing method and availability |
|---|---|---|
| Top bucket (32 kg)[a] Coarse river sand (CRS) - 10 kg wet ($F_m$ = 1.5-2, 95% $SiO_2$, 5% other metal oxides) | CRS is an inactive material used as coarse particulate filter, disperser, flow stabilizer, and to provide mechanical stability. Groundwater with high soluble iron is oxidized and precipitate as $Fe(OH)_3(s)$ in this media. | CRS is obtained from local river, thoroughly washed off clays and disinfected with bleach in large basins. |
| CIM (5-10 kg) | CIM is the active surface for complexation and immobilization of inorganic arsenic and many toxic metals cations. The final product is porous, lighter than original turnings and produce less fines for filter stability. | CIM is manufactured from cast iron turnings obtained from local foundry. Turnings are thoroughly washed, dried and treated with food grade acids to enhance HFO formation in a proprietary process. Finally, this mass is primed with water, stabilized and hardened in the filter to a CIM. |
| CRS and brick chips (BC): CRS - 10 kg wet, BC - 2.5 kg[b] | CRS and BC are inactive material and has similar functions. In combination these are used as a protection barrier for the free-flow junction outlet. | Same as top. BS are from local brick manufacturer, thoroughly washed and disinfected with bleach. |
| Bottom bucket (25 kg) CRS - 10 kg wet | Similar as above. This stage retains residual iron leached from the first stage CIM as HFO. Filter life span can be estimated from the residual iron from top bucket. | Same as above. |
| Wood charcoal (WC) - 1 kg - small cubes | WC is known to absorb organics (e.g., odor causing compounds, pesticide residues, etc.). WC is passive to arsenic but imparts better tasting water. | WC is obtained from firewood used for cooking. Large quantities are collected from local hotels and villagers. |
| Fine river sand (FRS) - 9 kg wet and BC - 3.5 kg | FRS is fine filtration media to catch any residual particulates. BC are used as stabilizing media and used as a protection barrier for the flow controller outlet. | Both obtained from local manufacturers, thoroughly washed and disinfected with bleach. |
| Other materials Plastic buckets - 40 L | Container. Only food grade high density (HDPP) buckets are used. | Local plastic molding industries buckets retrofitted with top cover and outlets for flow controller taps. |

TABLE 2-continued

Materials used in filter

| Material | Function and characteristics | Brief manufacturing method and availability |
|---|---|---|
| Flow controllers | Control flow to maintain optimum residence time for best arsenic removal. This is fixed in the factory. | Molded plastic or metal taps are available in local hardware stores. Modified to fix flow rate. |
| Metallic filter stand | Support for the buckets. | Made by local welders. |

Filter specifications: Top Bucket (Red): 45 L, dia/height: 46/44 cm, 1.5 kg; Bottom Bucket (green): 23 L, 38/36, 1 kg. Shipping dimension: h/w/l 1.22/0.42/0/45 meter, Wt 56 kg. Flow rate: 20-30 L/hour continuous. Water quality meets WHO and Bangladesh standards. Life span >5 yrs
[a]The top bucket may also contain a small perforated HDPP container (volume 1100 cm$^3$) full of small briquettes and sand as a water splash guard to prevent displacement of top sand layer.
[b]BC: silica 55%, alumina 30%, iron oxide 8%, magnesia 5%, lime 1% and others 1%

In another example, filtering water with CIM may also be achieved in one stage. On a small scale, CIM, charcoal and sand layers or any combination thereof may be placed in a single filter cartridge. The filter cartridge may be placed in a water filter.

The filter cartridge may also include a layer of brick chips or their equivalent (such as basaltic stone chips). Similarly, like above, sand may be any kind of sand, such as coarse river sand, processed river sand, and/or fine sand. Commercial filter sand of different grades may also be used.

It is possible that the number of layers is the same as that of the above two-filter system. However, as CIM is the active ingredient, it should be placed as one of the top layers within the filter cartridge to produce potable quality water.

As an embodiment, the water product may have an arsenic level of about 30 ppb or less. In some cases, the water product may have an arsenic level of about 10 ppb or less. In other cases, the water product may have an arsenic level of about 2 ppb or less.

As another embodiment, the water product may have a pH that ranges from about 7.4 to about 7.9. In some cases, the water product may have a pH of about 7.6.

Surprisingly, using CIM as the active compound produces high water quality content for the water product. The water quality may comprise, inter alia, less than about 0.25 mg of iron per liter of water product; less than about 0.22 mg of manganese per liter of water product; less than about 0.07 mg of aluminum per liter of water product; about 5 to about 87 mg of calcium per liter of water product; less than about 8 mg of magnesium per liter of water product; less than about 0.087 mg of barium per liter of water product; less than about 0.07 mg of nitrite per liter of water product; and less than about 1 mg of phosphate per liter of water product.

In addition to these benefits of removing toxic inorganic and organic species, the CIM is a natural nontoxic material. It can be disposed in the open and does not leach arsenic. CIM can also be used to make metallic iron. Because CIM can be recycled and reused again, filters including CIM can be considered "green."

III. Experiments and Results

The embodied filters were tested in areas with high arsenic levels in groundwater. Moreover, filter efficacy was tested using real groundwater containing varied concentrations of arsenic, iron, other inorganic species and water quality parameters. In one example, the Kushita district of Bangladesh served as a testing ground from 2000 to 2005. Filters were monitored for active used by householders from 2.3 to 4.5 years. TABLE 3 displays results of this exemplified experiment.

TABLE 3

Results of Six Different Monitored Filters

| Parameters* | Filter 1 Fatic | Filter 2 Courtpara | Filter 3 Zia | Filter 4 Alampur | Filter 5 Kaliskhnpur | Filter 6 Juniadah |
|---|---|---|---|---|---|---|
| Years in use | 2.32 | 4.5 | 2.66 | 3.6 | 4.4 | 2.5 |
| Water yield (L) | 67,760 | 125,000 | 77,840 | 104,960 | 128,480 | 72,960 |
| Number of measurements | 10 | 110 | 12 | 14 | 56 | 8 |
| As (Total) - Input, ppb | 32 ± 7 | 155 ± 7 | 243 ± 9 | 410 ± 15 | 1139-1600 | 2423 ± 87 |
| As (Total), Filter, ppb | <2 | 7 ± 1 | 7 ± 1 | 8 ± 2 | 7 ± 2 | 8 ± 4 |
| Fe(Total), Input, ppm | 20.7 ± 0.6 | 4.85 ± 0.25 | 7.35 ± 0.3 | 10.86 ± 0.56 | 1.53 ± 0.08 | 0.6 ± 0.03 |
| Fe(Total), Input, ppm | 0.22 ± 0.02 | 0.228 ± 0.04 | 0.25 ± 0.03 | 0.242 ± 0.03 | 0.25 ± 0.05 | 0.26 ± 0.03 |
| Cost, Taka/L (1 Taka = ~$0.016) | 0.031 | 0.016 | 0.026 | 0.02 | 0.016 | 0.028 |

*Flow rate ~20-~30 L/hour. Other water chemistry parameters are similar to that in TABLE 4. Consumption: ~60-~180 L/day. As(total) was measured by ASV on a thin film gold electrode validated by IAEA interlaboratory comparison studies at SDC/MSUK, Kushtia, Bangladesh and with Graphite Furnace AA at GMU Chemistry Department. Iron was measured spectrophotometrically at SDC/MSUK. Cost per liter decreases as more water is filtered.

As part of the parameters, the flow rate for the tested filters varied from ~20 to ~30 L/hour. Other water chemistry parameters are similar to that in TABLE 4. Consumption was measured at ~60 to ~180 L/day. As(total) was measured by Anodic Stripping Voltammetry (ASV) on a thin film gold electrode. Iron was measured spectrophotometrically.

TABLE 4

Water quality comparison from SONO Filter, US Environmental Protection Agency (EPA) World Health Organization (WHO) and Bangladesh Standards

| Constituent | US EPA (MCL) | WHO Guideline | Bangladesh Standard[a] | Influent Groundwater | SONO Filter Water[b] |
|---|---|---|---|---|---|
| Arsenic (total), mg/L | 0.01 | 0.01 | 0.05 | 0.005-4.000[c] | 0.003-0.020 |
| Arsenic (III), mg/L | | | | 0.005-2.000[d] | <0.005 |
| Iron (total), mg/L | 0.3 | 0.3 | 0.3 (1.0) | 0.2-20.7 | 0.19 ± 0.10 |
| pH | 6.5-8.5 | 6.5-8.5 | 6.5-8.5 | 6.5-7.5 | 7.6 ± 0.1 |
| Sodium, mg/L | | 200 | | <20.0 | 19-25 |
| Calcium, mg/L | | | 75 (200) | 120 ± 16 | 5-87 |
| Manganese, mg/L | 0.05 | 0.1-0.5 | 0.1 (0.5) | 0.04-7.0 | 0.04-0.5 |
| Aluminum, mg/L | 0.05-0.2 | 0.2 | 0.1 (0.2) | 0.015-0.15 | 0.11 ± 0.02 |
| Barium, mg/L | 2.0 | 0.7 | 1.0 | <0.30 | <0.082 |
| Chloride, mg/L | 250 | 250 | 200 (600) | 3-12 | 4.0-20.0 |
| Phosphate, mg/L | | | 6 | <12.0 | 0.9 ± 0.12 |
| Sulfate, mg/L | | | 100 | 0.3-12.0 | 12 ± 2 |
| Silcate, mg/L | | | — | 10-26 | 18 ± 6 |

[a]Bangladesh standard values are given as maximum desirable concentration with maximum permissible concentration in parentheses.
[b]SONO filters. ICP multielement measurements of Cu, Zn, Pb, Cd, Se, Ag, Sb, Cr, Mo, and Ni show concentrations below the USEPA and WHO limits at all times. All other measurements show average of semi-continuous measurement of more than 394,000 L of groundwater filtered by inventor and Environmental Technology Verification for Arsenic Mitigation (EVTAM) in at least eight different water chemistries in different regions of Bangladesh. Water chemistry parameters were recorded for 23 metals, 9 anions, redox potential - $E_h$, pH, Temp, dissolved oxygen, conductivity, and turbidity for hundreds of samples. All prescribed parameters passed the drinking water standards of WHO and Bangladesh.
[c]One tubewell at Bheramara was found to contain As(total) ~4 mg/L. The filtered water had ~0.007 mg/L. This well was later capped by the Government.
[d]In some wells, As(III) concentrations exceeded ~90% of the As(total).

TABLE 4 summarizes the results of more than 590,000 L of groundwater filtered in ten experimental filters located throughout Bangladesh. Of these, 577,000 L were tested by Sono Diagnostic Center (SDC)/Manob Sakti Unnayan Kendro (MSUK) at six locations as described in TABLE 3. Additionally, 17,334 L were tested by ETVAM at various locations throughout Bangladesh (such as Bera-Pabna, Hajigong-Comilla, Manikgang-Dhaka, Faridpur and Nawabgang-Rajshahi). As can be seen, filtered water parameters met and surprisingly exceeded USEPA, WHO and other international water quality standards.

Figure 4:
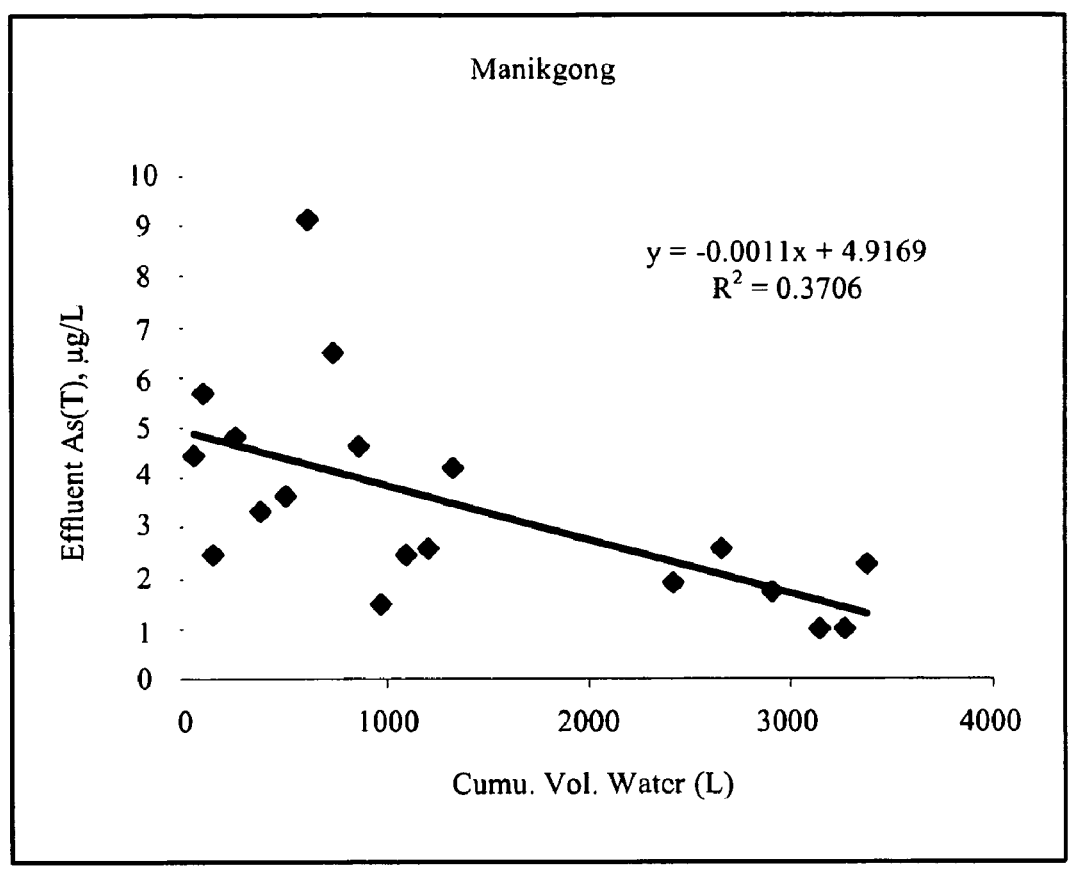
FIG. 4 shows an exemplified graph of filtered water test results using the iron composition in Manikgong, Bangladesh.

FIG. 4 shows results of a groundwater field test using a CIM water filter in Manikgong. Influent As(total) was measured at about 420 ppb to about 644 ppb, with As(III) at about 212 ppb to about 586 ppb. The highest influent phosphate, $PO_4^{3-}$, level was measured at about 9.8 mg/L. The highest influent silicate level was measured at about 38.1 mg/L. The highest influent sulfate level was measured at about 30.8 mg/L.

Figure 5:
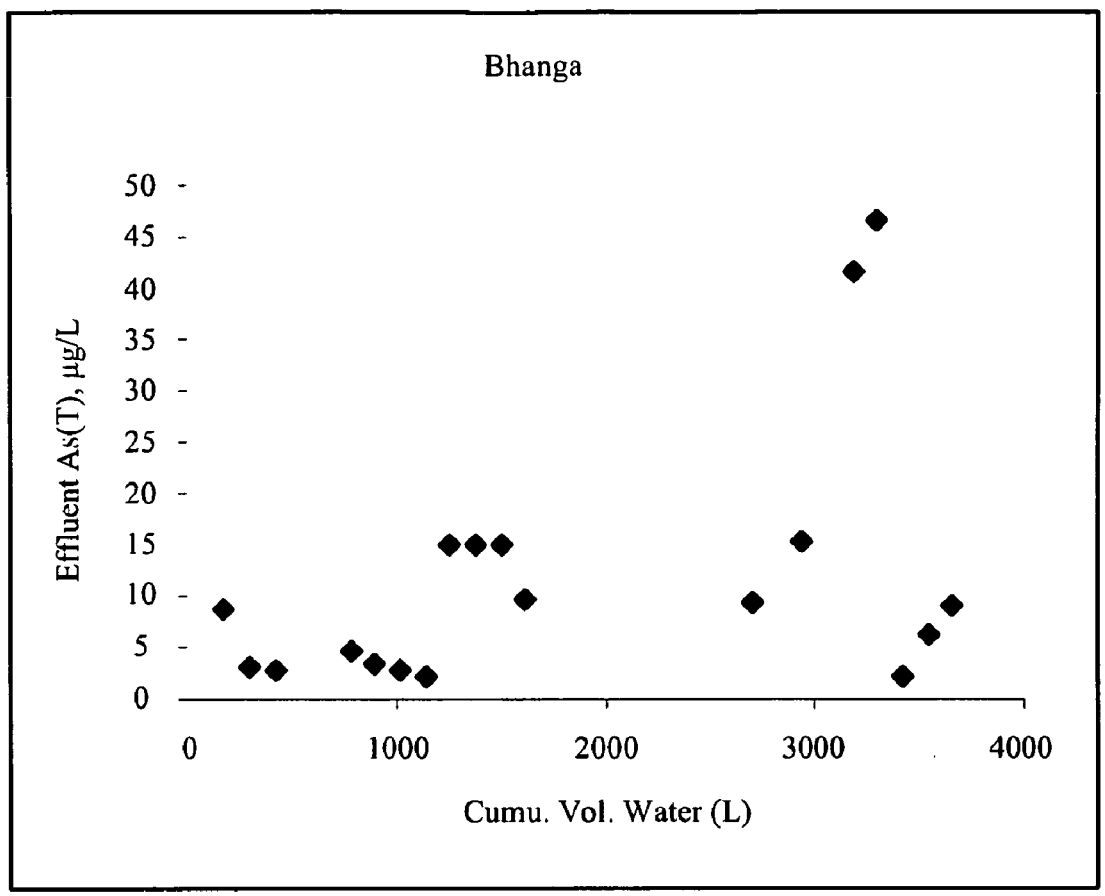
FIG. 5 shows an exemplified graph of filtered water test results using the iron composition in Bhanga, Bangladesh.

FIG. 5 shows results of a groundwater field test using a CIM water filter in Bhanga. Influent As(total) was measured at about 300 ppb to about 383 ppb, with As(III) at about 184 ppb to about 278 ppb. The highest influent phosphate level was measured at about 1.0 mg/L. The highest influent silicate level was measured at about 32.4 mg/L. The highest influent sulfate level was measured at about 1.0 mg/L.

Figure 6:
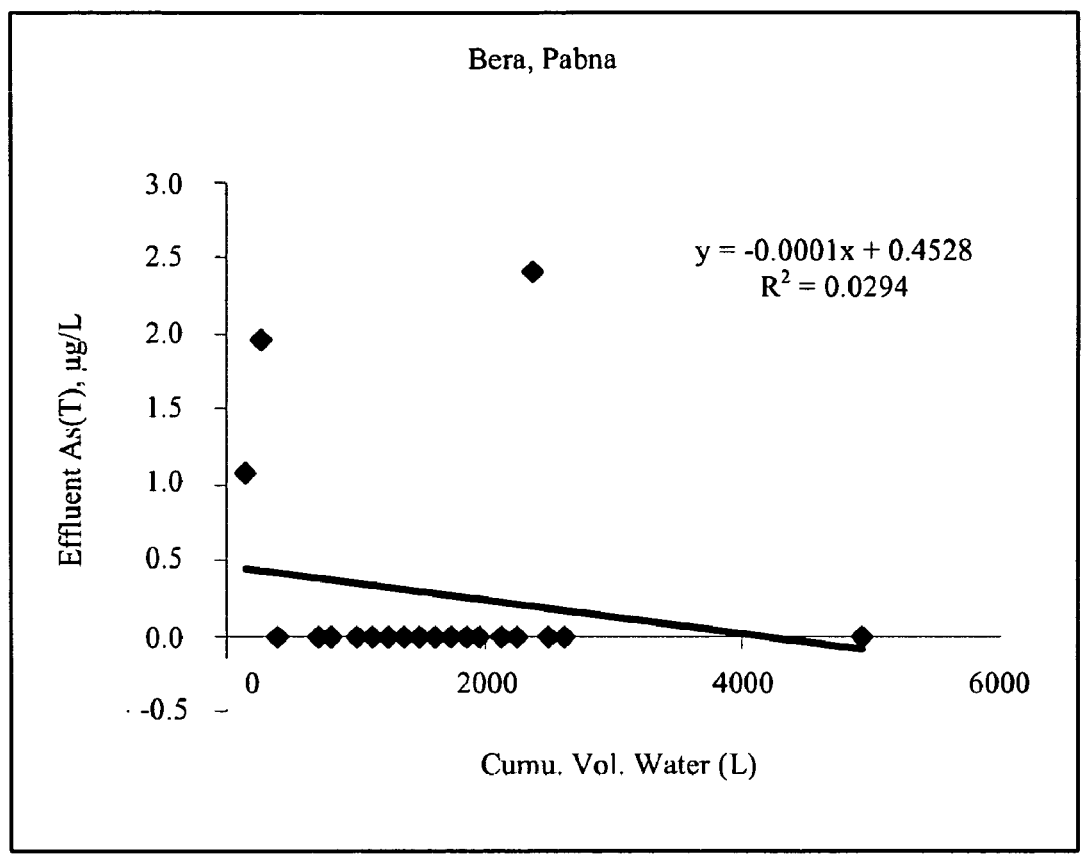
FIG. 6 shows an exemplified graph of filtered water test results using the iron composition in Bera, Pabna, Bangladesh.

FIG. 6 shows results of a groundwater field test using a CIM water filter in Bera, Pabna. Influent As(total) was measured at about 215 ppb to about 396 ppb, with As(III) at about 193 ppb to about 302 ppb. Influent Fe(total) averaged at about 15 mg/L. Effluent Fe(total) was found to be about 0.113 mg/L. Influent phosphate was found to be about 3.5 mg/L. Influent silicate level was found to be about 34 mg/L.

Figure 7:
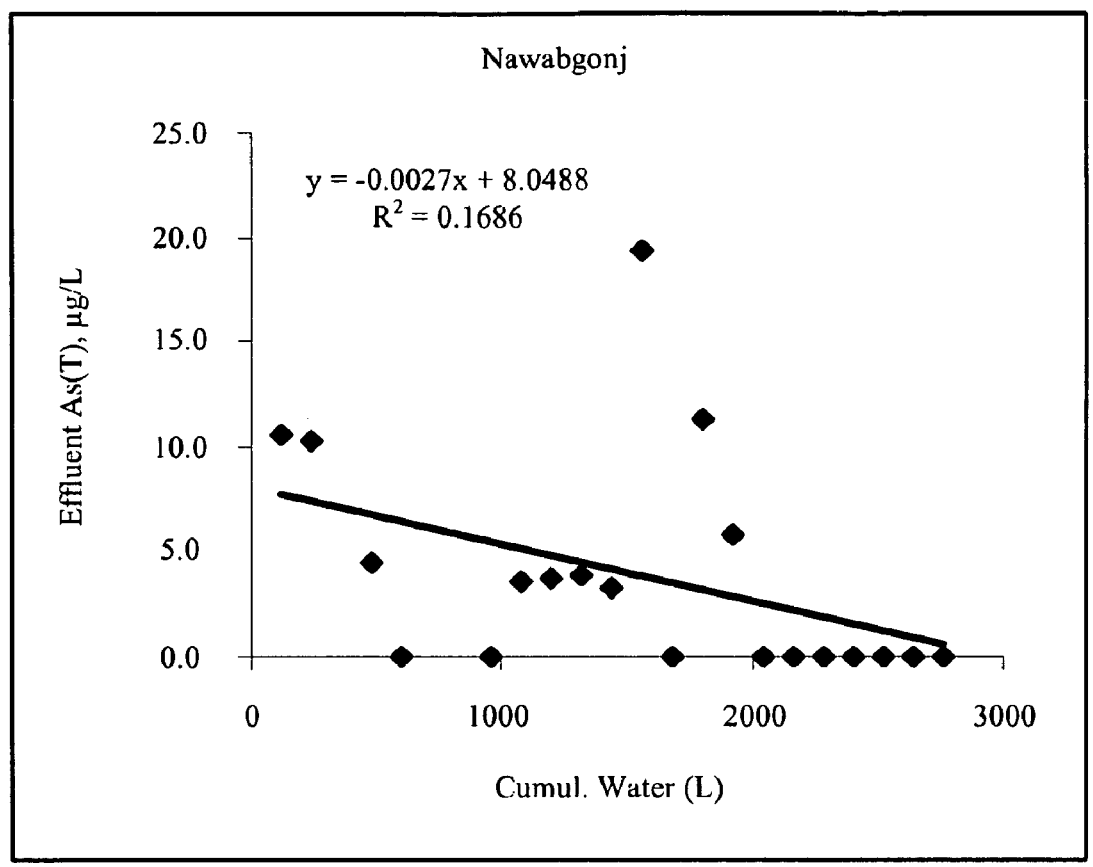
FIG. 7 shows an exemplified graph of filtered water test results using the iron composition in Nawabgonj, Bangladesh.

FIG. 7 shows results of a groundwater field test using a CIM water filter in Nawabgonj. Influent As(total) was measured at about 778 ppb to about 1239 ppb, with As(III) at about 740 ppb to about 877 ppb. Influent Fe(total) averaged at about 5.17 mg/L. Effluent Fe(total) was found to be about 0.046 mg/L. Influent phosphate was found to be about 2.1 mg/L. Influent silicate level was found to be about 34 mg/L.

Most toxic As(III) species from groundwater can be removed without chemical pretreatment below the detection limit (~2 μg/L). It can also remove manganese, which is now implicated as a toxic trace metal. Also, the filter may produce filtered water with low concentrations in Ca and Fe, and thus making the filtered water a soft water that is lighter to taste and pleasant to drink.

Figure 8:
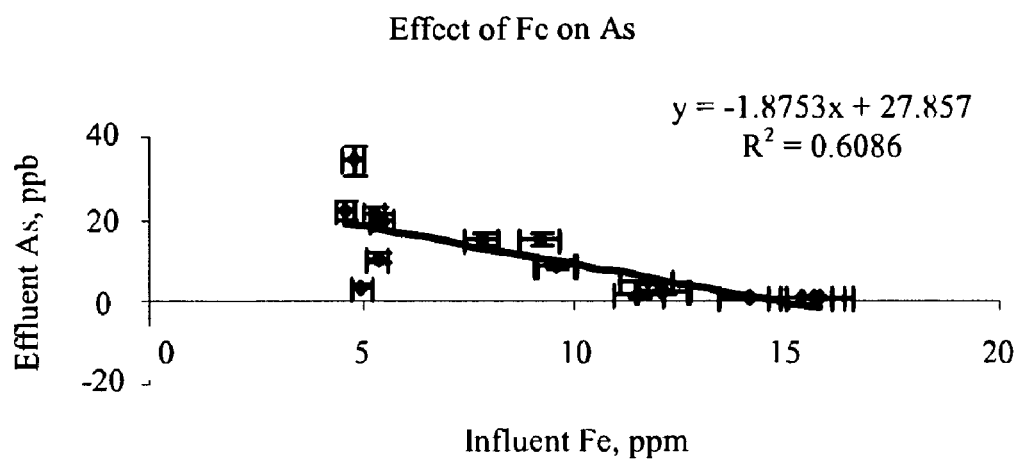
FIG. 8 shows an exemplified graph of the effect of soluble iron on arsenic.

It remains known that the performance of most filtration technologies can be affected by naturally occurring soluble iron and phosphate. For example, as shown in FIG. 8, soluble iron can enhance the retention of arsenic in the filter through co-precipitation and complex formation. Results were obtained from fields where soluble iron in influent water was above the potable limit.

Quite surprisingly, in the all cases (including data in TABLE 3), the filter with CIM removed not only arsenic, but also the soluble iron by ~99% and made the water potable.

Figure 9:
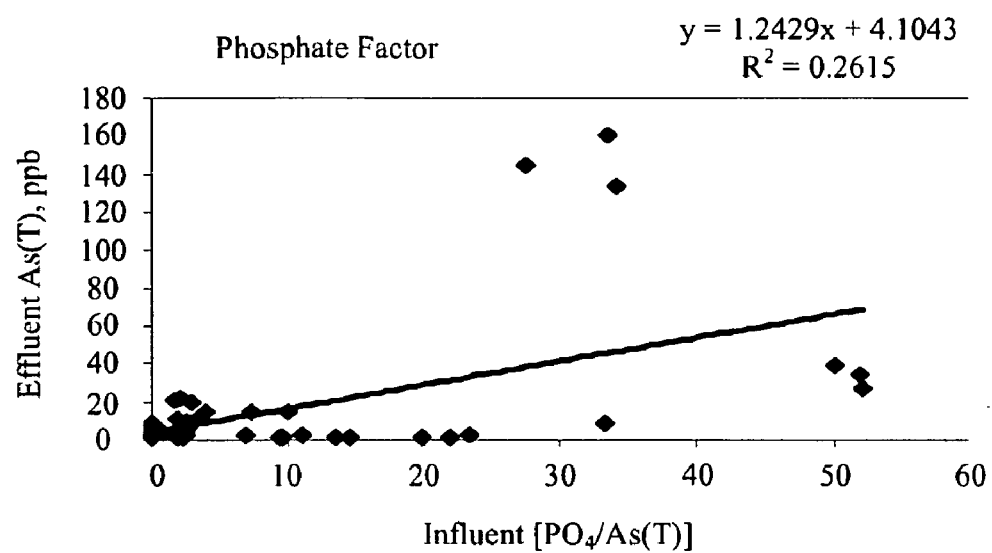
FIG. 9 shows an exemplified graph of the effect of soluble phosphorous on arsenic.

However, a similar effect cannot be said of phosphate. Phosphate is often considered the competing ion for arsenate. In addition, phosphate has the potential to negatively affect the performance of the filter. The effect of phosphate on the effluent As(total) can be seen in FIG. 9. There appears to be no clear effect of phosphate on the removal capacity of arsenic. Moreover, it appears that phosphate does not affect the performance of the filter with CIM, even at ~40-~50 mg/L concentration.

Figure 10:
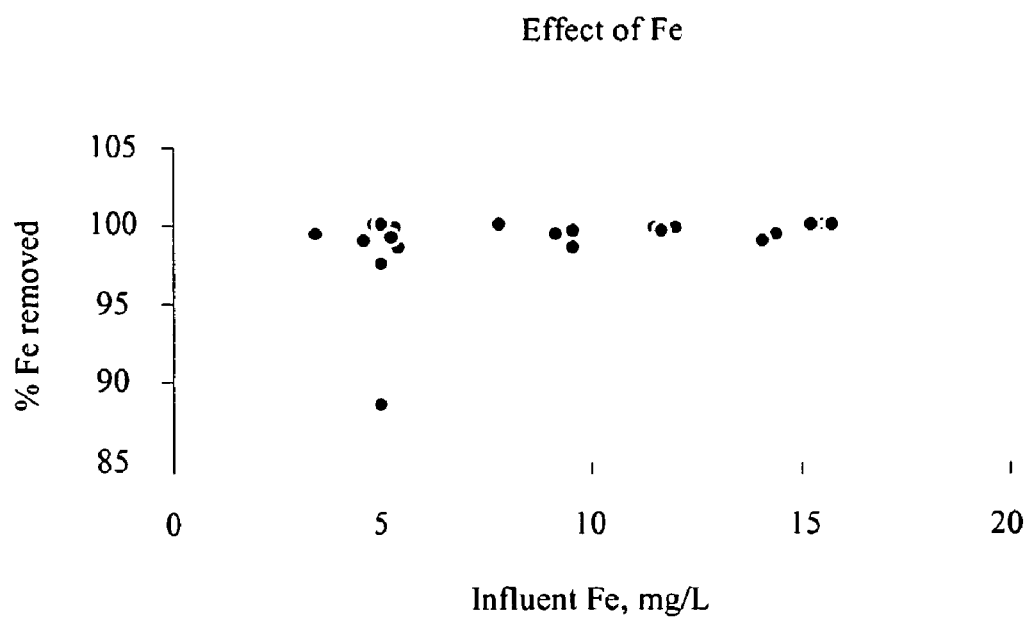
FIG. 10 shows an exemplified graph of the removal efficiency of iron using the iron composition in a water filter.
Figure 11:
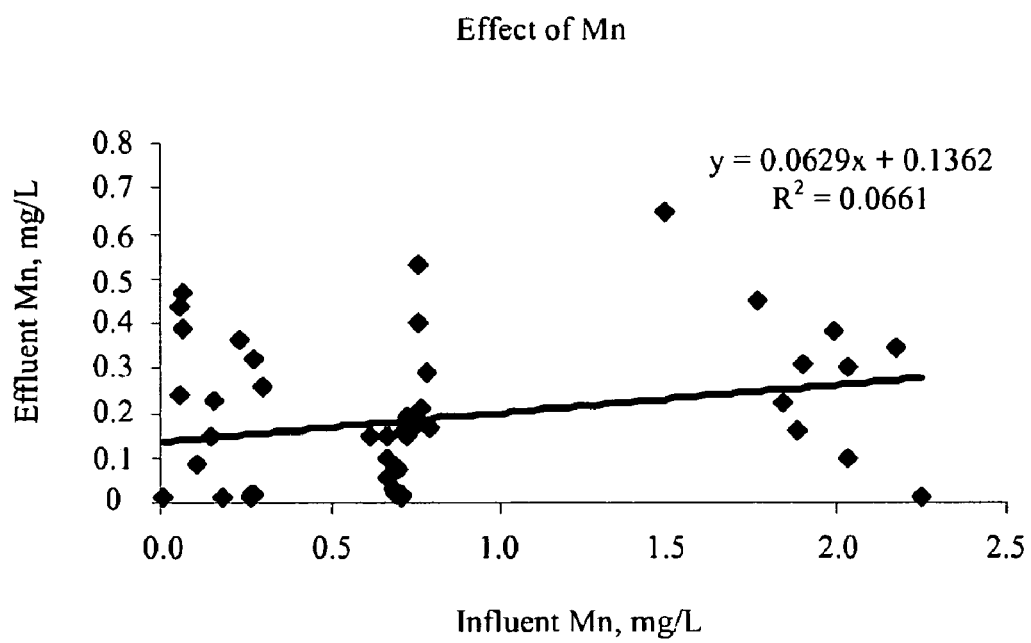
FIG. 11 shows an exemplified graph of the removal efficiency of manganese using the iron composition in a water filter.
Figure 12:
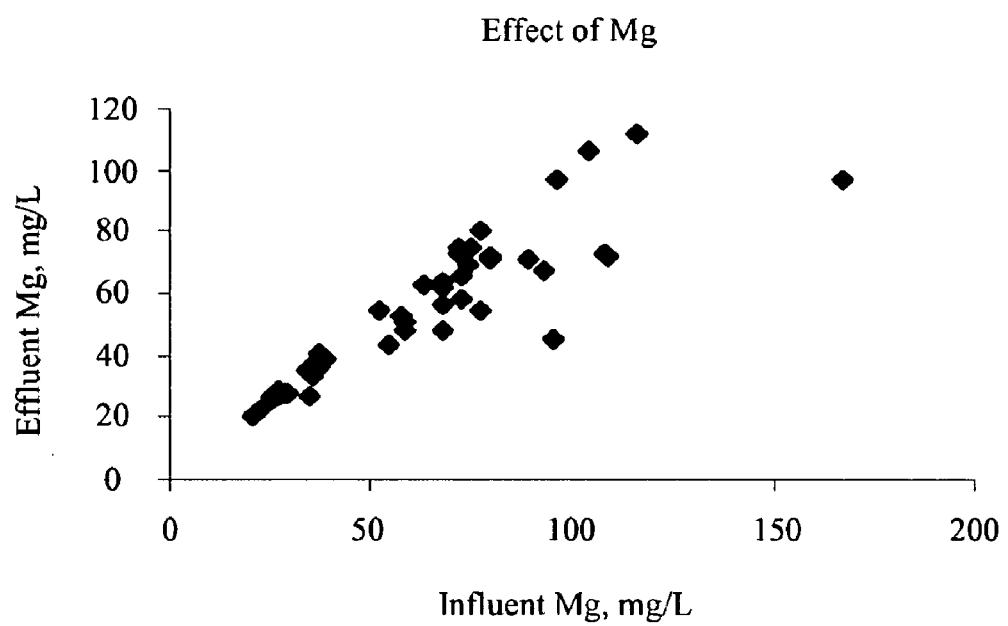
FIG. 12 shows an exemplified graph of the removal efficiency of magnesium using the iron composition in a water filter.
Figure 13:
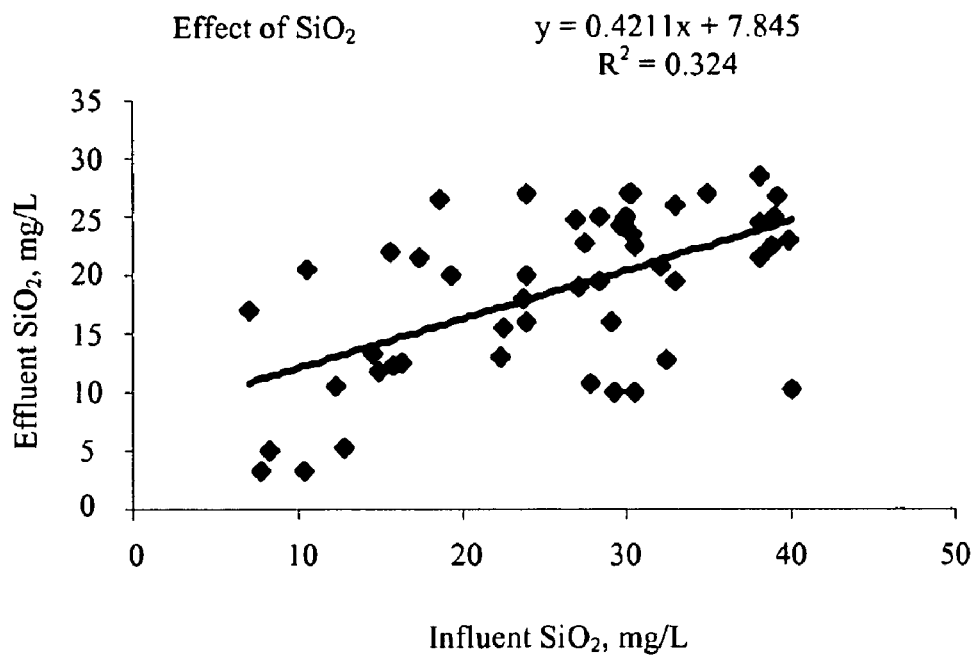
FIG. 13 shows an exemplified graph of the removal efficiency of silicon dioxide using the iron composition in a water filter.

Besides effects on the CIM water filter, the CIM water filter can also remove various species. For instance, FIG. 10 shows the removal efficiency of Fe. FIG. 11 shows Mn removal efficiency. FIG. 12 shows Mg removal efficiency. FIG. 13 shows $SiO_2$ removal efficiency.

In another example, 165 filters were tested in Hajigong, Comilla, Bangladesh in a span of 1 year by a total of about 3000 family members and 300 arsenicosis patients. There, the tubewell water has an arsenic total count of about 600 to about 700 ppb, where >50% is in the form of As(III). The As (total) in filtered water showed <2 ppb (~70%). <10 ppb (~20%), <30 ppb (~10%) (n=145). The filtered water did not result in an As count above 30 ppb. It is important to note that the year long experiment experienced no change in flow rate. Additionally, it is important to note that no maintenance was required for 12 months.

Figure 14:
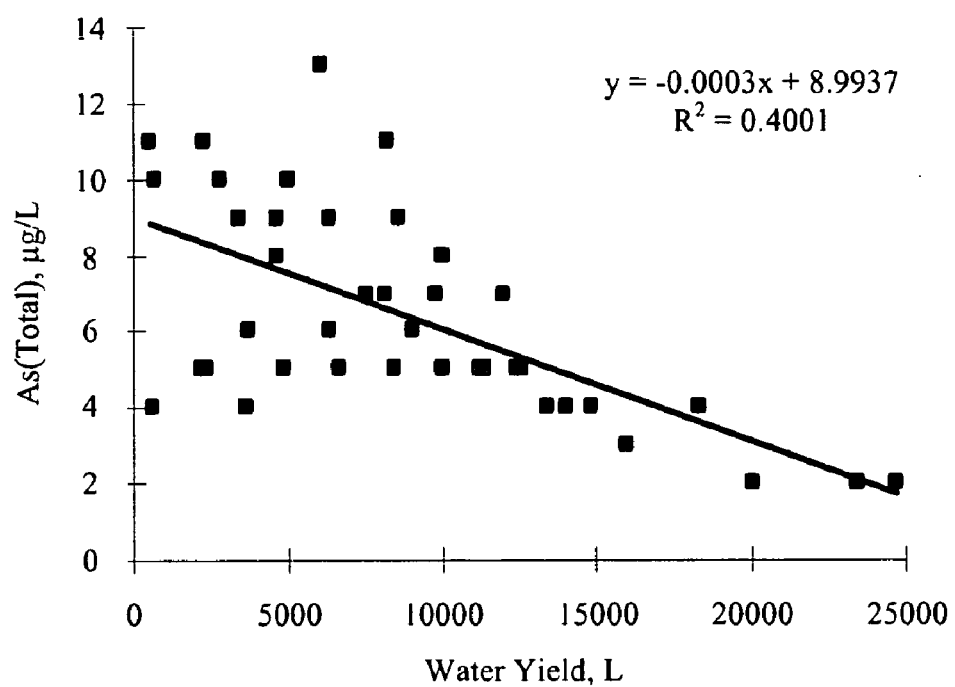
FIG. 14 shows an exemplified graph of tubewell water test results of Kushtia, Bangladesh.

In combination with CIM, the sand, charcoal and an embodied arrangement of the materials, the filter may remove arsenic, iron, manganese and other inorganic species to a potable water quality. FIG. 14 shows typical test results in which 25,000 L of tubewell water containing 1139-1600 µg/L of As (total) was filtered to produce potable water with less than 14 µg/L As (Total) until a detection limit (such as 2 µg/L) is reached. This progressive decrease in effluent arsenic is unique to the CIM filter. In addition, recent environmental technologies verification programs for arsenic mitigation (ETVAM) also confirmed these results when compared to Alumina (ALCAN), Cerium Hydroxide Ion Exchange Resin (READ-F), and Microfine Iron Oxide (SIDCO) based filters. This unique property is attributable to the generation of new complexation sites on CIM through in situ iron oxidation and surface chemical reactions, as shown in TABLE 1.

Arsenic complexation reaction also indicates zero order kinetics with respect to the influent As (total) concentration. This order generally means high arsenic removal capacity that is independent of input As(total) (up to ~4000 µg/L). It may also imply that no breakthrough of arsenic for the filter's life. The filter life span can be calculated by assuming a worst-case scenario where the filter looses 500 µg/L of iron from the CIM at about 200 L/day of use. At such loss, it may take about 274 years to loose 1000 g of iron when 20,000,000 L water is filtered.

The life span of this exemplified filter can be estimated using data on a Freundlich isotherm with CIM:

$$\log\left(\frac{X}{M}\right) = \log K + (1/n)\log C_f \quad (1)$$

X represents the µg/L of As adsorbed. M represents the g of CIM used. $C_f$ represents the free arsenic in µg/L. Adsorption capacity may be K=139.3. Adsorption intensity may be n=−1.9.

It was found to take about 14 years to reach the 50 µg/L MCL breakthrough from influent water containing ~300 µg/L As(total) at 80 L/day usage rate and a filter with 10,000 g of CIM. Although these calculations appear disparate, it shows that the filter will work for years before breakthrough occurs.

The MCL breakthrough can be further extended by the co-precipitation of arsenate by HFO produced from Fe(II) present in groundwater, even at low concentrations (e.g., ~1.0 mg/L).

Figure 15:
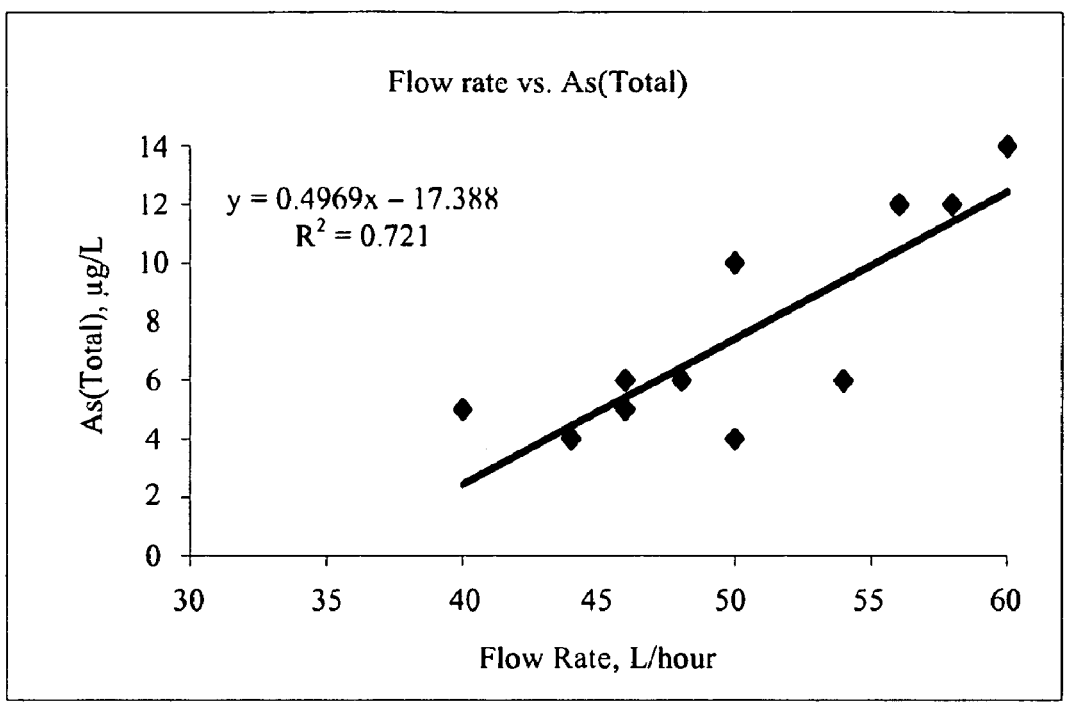
FIG. 15 shows an exemplified graph identifying the effect of flow rate on effluent As(total).

FIG. 15 shows that the filter can even work at a flow rate of ~60 L/hr without breakthrough. However, due to unknown water chemistry and varied As(total) in groundwater, the flow rate may be fixed at ~20 to ~30 L/hr to ensure long term use and effluent As(total) below 30 µg/L.

Figure 16:
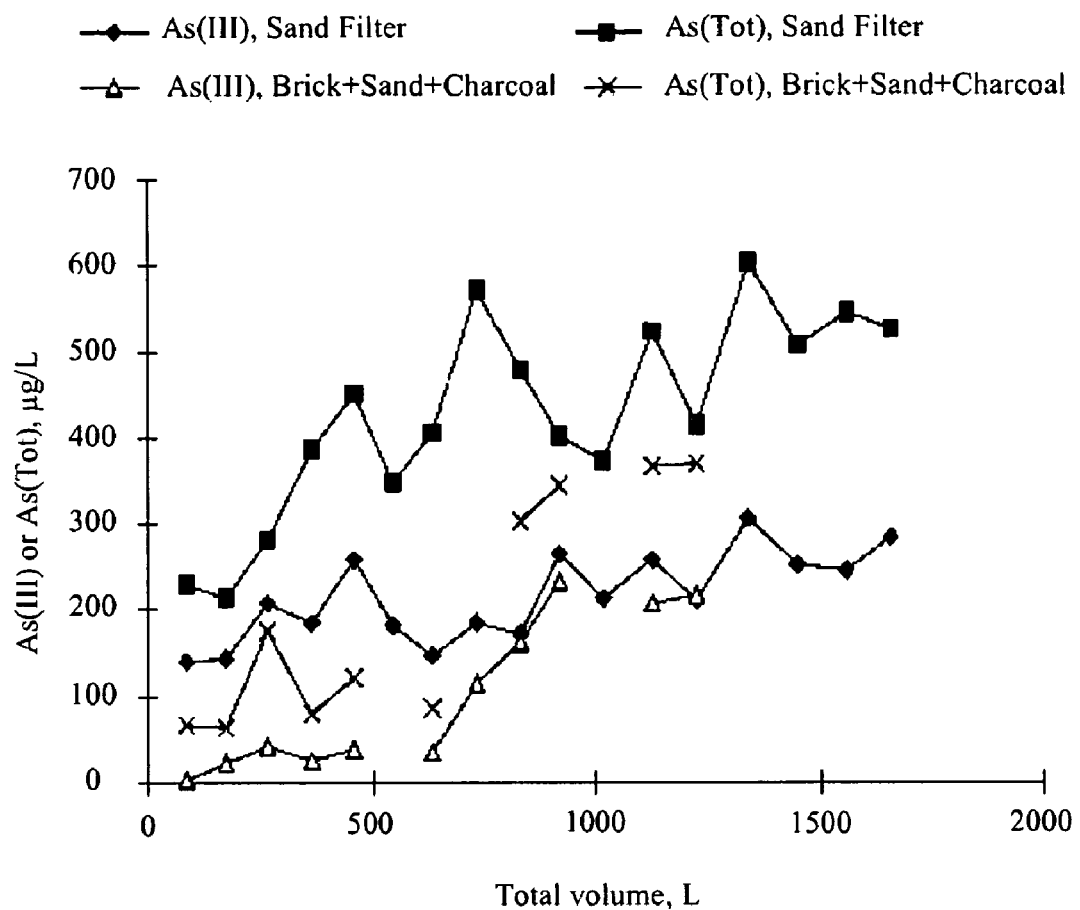
FIG. 16 shows an exemplified graph of blank filters showing arsenic breakthrough.

In contrast, blank filters (i.e., filters without CIM) tend to have a breakthrough at ~88 L of groundwater, as shown in FIG. 16. Here, data in this figure were based on groundwater having a composition of (1) As(III): 300 µg/L; (2) As(total): 996 µg/L; and (3) Fe(II): 1.0 mg/L. For the blank filter having only sand, the filtered water had a temperature of 27.3° C., pH of 7.6±0.1, TDS of 210±6 (mg/L) and $E_h$ of 158±6 mV vs. NHE. For the blank filter having only sand, brick and charcoal, the filtered water had a temperature of 25.7° C., pH of 7.9±0.1, TDS of 208±12 (mg/L) and $E_h$ of 148±6 mV vs. NHE. Additionally, the latter blank filter showed no detectable total Fe (II+III) in the filtered water.

These experiments further demonstrate that plain sand filters broke through the MCL almost instantaneously. A low iron concentration (e.g., ~1.0 mg/L) in groundwater may be selected for this study to ensure HFO precipitate from this iron would not bias the results by co-precipitation and complexation of arsenic species.

In other experiments conducted by Shaw Environmental Inc. (Shaw) for the EPA and National Academy of Engineering (NAE), over a two-week test period, influent and effluent metal concentrations, anion concentrations and water quality data parameters were measured over an average flow rate of 190 ml per minute and with the average volume of water treated at about 66 L per ~8 hours. Overall, Shaw deemed the water quality to be excellent, where the water was clear and colorless.

Analyzing the metal concentrations (total arsenic, As(III), As(V), iron, calcium, aluminum, magnesium, sodium and silicon), Shaw tested total (as opposed to dissolved) concentrations using a Perkin-Elmer Optima 2100 Series Inductively Coupled Plasma (ICP) instrument with an Optical Emission Spectrometer. Shaw performed arsenic speciation by using a Solid Phase Extraction Cartridge (SPC)—Waters Corporation Sep-Pak Plus Accell Plus QMA cartridges 37-55 µm—followed by an analysis of As(III)-bearing filtrate by ICP. Results of the metal analysis are shown in TABLE 5.

TABLE 5

Metals concentration analysis

| Metal | Influent (mg/L) | | Effluent (mg/L) | |
|---|---|---|---|---|
| | Average | Std. Dev. | Average | Std. Dev. |
| Arsenic (total) | 0.340 | 0.031 | 0.007 | 0.003 |
| Arsenic (III) | 0.047 | 0.060 | 0.001 | 0.001 |
| Arsenic (V) | 0.293 | 0.045 | 0.006 | 0.003 |
| Iron | 2.014 | 0.112 | 0.008 | 0.012 |
| Calcium | 34.36 | 1.46 | 41.99 | 4.37 |
| Aluminum | 0.230 | 0.037 | 0.066 | 0.017 |
| Magnesium | 11.74 | 0.46 | 7.81 | 1.34 |
| Sodium | 33.58 | 0.90 | 32.96 | 1.49 |
| Silicon | 2.456 | 0.394 | 1.556 | 0.480 |

It was determined that the average removal efficiencies for As(total), As(III), and As(V) were 98%, 98%, and 98% respectively. Although the experiment involved the addition of equal concentrations of As(III) and As(V) to the feed water, As(III) oxidized rapidly to As(V) at the influent sample location.

Anion concentration were also analyzed. Using a Dionex ICS 2500 ion chromatograph (IC), Shaw determined the following anion concentrations for sulfate, chloride, nitrate and phosphate. As shown in TABLE 6, tested anion concentrations in the treated effluent water decreased slightly when compared to the influent test water.

TABLE 6

Anions concentration analysis

| Anion | Influent (mg/L) | | Effluent (mg/L) | |
| --- | --- | --- | --- | --- |
| | Average | Std. Dev. | Average | Std. Dev. |
| Sulfate | 75.879 | 7.302 | 66.483 | 6.357 |
| Chloride | 95.926 | 10.735 | 90.327 | 24.089 |
| Nitrate | 2.191 | 0.300 | 1.581 | 0.715 |
| Phosphate | 0.579 | 0.205 | 0.404 | 0.103 |

Water quality parameters were also tested. As shown in TABLE 7, these include pH, Dissolved Oxygen (DO), Chlorine, Turbidity and Alkalinity. Other water quality parameters, as shown in TABLE 8. were also tested. These include Hardness. Total Organic Carbon (TOC), Particle count in the 1-10 micron range, Total Suspended Solids (TSS) and Total Dissolved Solids (TDS). However, unlike TABLE 7, Shaw only collected two samples for the parameters in TABLE 8.

TABLE 7

Water quality parameters analysis

| Water quality parameter | Influent (mg/L) | | Effluent (mg/L) | |
| --- | --- | --- | --- | --- |
| | Average | Std. Dev. | Average | Std. Dev. |
| pH | 6.34 | 0.33 | 7.39 | 0.26 |
| DO, mg/L | 2.30 | 0.50 | 3.51 | 0.26 |
| Chlorine, mg/L | 0.01 | 0.01 | 0.01 | 0.01 |
| Turbidity, NTU | 1.1 | 0.1 | 0.2 | 0.1 |
| Alkalinity, mg/L | 2.0 | 0.7 | 23.3 | 22.6 |

According to Shaw, the DO levels in the influent water rose from the tank DO level as it was pumped into the test unit. The DO level continued to increase in the treatment unit. Furthermore, the alkalinity in the treated effluent water increased by an order of magnitude only in some cases. Meanwhile, the CIM water filter removed ~80% of the influent test water turbidity.

TABLE 8

Miscellaneous water quality parameters analysis

| Water quality parameter | Influent (mg/L) | | Effluent (mg/L) | |
| --- | --- | --- | --- | --- |
| | Average | Std. Dev. | Average | Std. Dev. |
| Hardness, mg/L | 118.2 | 5.9 | 127.6 | 0.6 |
| TOC, mg/L | 0.1759 | 0.14 | 0.3604 | 0.3 |
| Particle count, count/ml (1-10 μm) | 8,752 | 6,029 | 7,246 | 9,103 |
| TSS, mg/L | 5 | 4 | 3 | 3 |
| TDS, mg/L | 276 | 25 | 259 | 68 |

IV. Maintenance

The claimed invention generally does not require special maintenance. However, where a filter uses the CIM technology, like that shown in FIG. 3, the upper sand layers should be changed when the apparent flow rate decreases (e.g., <10 L/hour). Experiments show that flow rate may decrease ~20%-~30% per year if groundwater has high iron (e.g., >5 mg/L) due to formation and deposition of natural HFO in sand layers. The sand layers (~0.5-~1 inch thick) can be removed, washed and reused or replaced with new sand. This half-yearly maintenance may be necessary, especially where groundwater may contain more than 5 mg/L of soluble iron.

The presence of soluble iron and formation of HFO precipitate is a common among all sorts of filtration technologies. Occasional water flow disturbance may also occur due to the accumulation of sand/HFO deposits in the tap nozzles, which can be removed by detaching and cleaning the tap in a flowing water stream. Alternatively, the nozzle end can be gently poked with a sewing needle to remove such deposits. However, such problem is not a significant one.

Tubewells may be used to extract groundwater to avoid drinking surface water that may be contaminated with pathogenic bacteria. However, pathogenic bacteria may still be found in drinking water due to unhygienic handling practices and in shallow tubewells, such as near unsanitary latrines and ponds. To kill pathogenic bacteria and eliminate or minimize thermo tolerance coliform (ttc) count, hot water (e.g., 5 L) may be poured into each filter on a routine basis (e.g., daily, weekly, bimonthly, monthly, quarterly, etc.) or on random intervals. As one embodiment, this protocol may be followed weekly. Alternatively, the filters may be washed with diluted bleach. The filters with CIM are not known to foster pathogenic bacteria on their own.

Where water appears visibly turbid, this sign indicates that the filters may not have been used for a while, or that the flow-filter may be malfunctioning. To resolve this problem, the filter may be flushed by filtering water through several times (e.g., 3-4 times).

The overall maintenance process can take about 20 to 30 minutes. Because the filter has no breakthrough, the active media does not generally require any processing (e.g., backwashing, regeneration, etc.). It is expected that the filter can produce potable water for at least five years.

With respect to managing residue, the total available leaching protocol (TALP) may be determined on used sand and CIM-Fe. TALP is similar to EPA's toxicity characteristic leaching procedure (TCLP), except that the samples were ground to find powder prior to leaching at two different pH values. The procedure may be followed with rainwater (which may be adjusted to a pH of ~7), where the primary mode of transport of water soluble species takes place during a rainy season. As shown in TABLE 9. the results indicate that the spent material is completely nontoxic with <16 μg/L As(total), which is about 300 times less than the EPA limit.

TABLE 9

Trace element distribution of leachates from filter spent material by TALP

| Element | Conc. (mg/L) at pH = 7 (Sand) | Conc. (mg/L) at pH = 4 (Sand) | Conc. (mg/L) at pH = 7 (Sand + Iron) | Conc. (mg/L) at pH = 4 (Sand + Iron) | Conc. (mg/L) at pH = 7 (Sand + Iron) Rainwater |
| --- | --- | --- | --- | --- | --- |
| Al | 0.028 | 0.02 | 0.049 | 0.014 | 0.02 |
| As (EPA = 5) | <0.016 | <0.016 | <0.016 | 0.025 | <0.016 |

TABLE 9-continued

Trace element distribution of leachates from filter spent material by TALP

| Element | Conc. (mg/L) at pH = 7 (Sand) | Conc. (mg/L) at pH = 4 (Sand) | Conc. (mg/L) at pH = 7 (Sand + Iron) | Conc. (mg/L) at pH = 4 (Sand + Iron) | Conc. (mg/L) at pH = 7 (Sand + Iron) Rainwater |
|---|---|---|---|---|---|
| Ba | 0.002 | 0.007 | 0.006 | 0.009 | 0.008 |
| Ca | 2.65 | 8.39 | 4.89 | 8.13 | 4.00 |
| Cu | 0.005 | 0.018 | 0.007 | 0.008 | 0.002 |
| Fe | 0.02 | 0.031 | 0.041 | 0.051 | 0.016 |
| Mg | 0.2 | 1.03 | 0.519 | 0.831 | 0.52 |
| Mn | 0.013 | 0.081 | 0.005 | 0.047 | 0.002 |
| Ni | 0.002 | 0.009 | 0.003 | 0.005 | 0.004 |
| K | 0.82 | 1.26 | 0.608 | 0.527 | 0.62 |
| Na | 2.64 | 0.750 | 3.35 | 1.85 | 7.2 |
| Sr | 0.006 | 0.017 | 0.014 | 0.02 | 0.012 |
| Sn | 0.007 | 0.011 | 0.003 | 0.006 | 0.003 |
| Zn | 0.011 | 0.038 | 0.013 | 0.021 | 0.024 |

Note:
The "<" sign indicates the instrumental detection limit for ICP-AES and specified as the concentration below the detection limit (bdl). For As, the bdl is 0.016 mg/L or 16 ppb. Other metals - Pb, Cd, Se, Ag, Sb, Cr and Mo were either below the method detection limit or the drinking water limit. Sand:Iron = 50:50. Iron is CIM-Iron.

Similar results have also been reported by EVTAM using EPA's TCLP methods. Further tests on backwash of filter waste show that the filters with CIM produced the lowest concentrations of As(total) (~93 mg/kg) in comparison to commercial filters based on activated alumina (~377 mg/kg), cerium hydroxide based ion exchange resin (~105 mg/kg), and microfine iron oxide (~2339 mg/kg) in solid waste. These values fall below EPA limits of 5000 mg/kg. The arsenic species in the filter's used sand and CIM should be in the oxidized form and be firmly bound with insoluble solid CIM. This characteristic is similar to a self-contained naturally occurring compound in the earth's crust. In another perspective, it is almost like disposing soil on soil. Furthermore, according to the NAE, used CIM may be characterized as "non detectable and non hazardous (limit 0.50 mg/L)" by the TCLP.

The foregoing descriptions of the embodiments of the claimed invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the claimed invention and its practical application to thereby enable others skilled in the art to best utilize it in various embodiments and with various modifications as are suited to the particular use contemplated without departing from the spirit and scope of the claimed invention. In fact, after reading the above description, it will be apparent to one skilled in the relevant art(s) how to implement the claimed invention in alternative embodiments. Thus, the claimed invention should not be limited by any of the above described example embodiments.

In addition, it should be understood that any figures, graphs, tables, examples, etc., which highlight the functionality and advantages of the claimed invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the claimed invention of the application. The Abstract is not intended to be limiting as to the scope of the claimed invention in any way.

Furthermore, it is the applicants' intent that only claims that include the express language "means for" or "step for" be interpreted under 35 U.S.C. §112, paragraph 6. Claims that do not expressly include the phrase "means for" or "step for" are not to be interpreted under 35 U.S.C. §112. paragraph 6.

A portion of the claimed invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

REFERENCES

M. Alauddin et al., Arsenic Exposure and Health Effects IV 439-449 (W. R. Chappell et al. ed., Elsevier Science 2001) (2001).

Arsenic Mitigation Pilot Project: Bacteriological Field Test Report, Dhalipara & Dozaipara of Muradpur Union in Sitakunda, Vill. Educ. Res. Ctr. (VERC), B-30, Ekhlas Uddin Khan Road, Anandapur. Savar, Dhaka-1340, Bangladesh (2006).

Bangladesh Pat. No. 1003935, 2002 (issued Aug. 10, 2002).

A. Chatterjee et al., Arsenic in Groundwater in Six Districts of West Bengal, India: The Biggest Arsenic Calamity in the World. Part 1—Arsenic Species in Drinking Water and Urine of the Affected People. 120 Analyst 643-50 (1995).

C. Davis et al., Modeling Silica Sorption to Iron Hydroxide, 36 Envtl. Sci. Tech. 582-87 (2002).

D. A. Dzombak & F. M. M. Morel, Surface Complexation Modeling: Hydrous Ferric Oxide (Wiley-Interscience, NY) (1990).

J. Farrell et al. Electrochemical and Spectroscopic Studies of Arsenate Removal from Water Using Zero-Valent Iron Media. 35 Envtl. Sci. Tech. 2026-32 (2001).

Grainger Challenge, available at http://www.nae.edu/nae/grainger.nsf

Joe Graziano, Poison in the Well: The Case of Arsenic in Drinking Water in Bangladesh, Abstract #250, 37th Middle Atlantic Regional Meeting. Sess: Assuring Water Purity. Am. Chem. Soc'y (2005).

J. J. Hurd, Evaluation of Three Arsenic Removal Technologies in Nepal 47-50 (June 2001) (MS Thesis, Massachusetts Institute of Technology) (on file with Massachusetts Institute of Technology).

A. Hussam et al., *Chemical Fate of Arsenic and Other Trace Metals in Groundwater of Bangladesh: Experimental Measurement and Chemical Equilibrium Model*, 38 J. ENVTL. SCI. & HEALTH. PART A. TOXIC/HAZARDOUS SUBSTANCES & ENVTL. ENG'G 71-86 (2003).

A. Hussam & A. K. M. Munir, *Development and Deployment of Arsenic Filters for Groundwater of Bangladesh*, Abstract #252, 37th Middle Atlantic Regional Meeting. Sess: Assuring Water Purity. Am. Chem. Soc'y (2005).

IARC MONOGRAPHS ON THE EVALUATION OF THE CARCINOGENIC RISK OF CHEMICALS TO HUMAN 20 (Int'l Agency for Res. on Cancer ed., Lyons 1980) (1980) (updated in ARSENIC IN DRINKING WATER 2001 UPDATE, (Nat'l Acad. Press, DC 2001) (2001)).

M. S. Islam et al., *Microbiological Analysis of Tube-Well Water in a Rural Area of Bangladesh*, 67 APPL ENVTL. MICROBIOL. 3328-30 (2001).

A. H. Khan et al., *Appraisal of a Simple Arsenic Removal Method for Groundwater of Bangladesh*, A35 J. ENVTL. SCI. & HEALTH 1021-41 (2000).

B. A. Manning et al., *Surface Structures and Stability of Arsenic(III) on Goethite: Spectroscopic Evidence for Inner Sphere Complexes*, 32 ENVTL SCI. AND TECH. 2383-88 (1998).

MINTEQA2 Model System. Ctr. For Exposure Assessment Modeling, EPA, 960 College Station Rd., Athens, Ga. 30605-2720 (2001).

A. K. M. Munir et al., *Evaluation of the Performance of the SONO3-Kolshi Filter for Arsenic Removal from Groundwater Using Zero Valent Iron through Laboratory and Field Studies*. Proc. Int'l Workshop on Tech. for Arsenic Removal from Drinking Water, Bangladesh U of Eng'g and Tech. and U.N. U, Japan 171-189 (2001).

PERFORMANCE EVALUATION AND VERIFICATION OF FIVE ARSENIC REMOVAL TECHNOLOGIES: EVTAM FIELD TESTING AND TECHNOLOGY VERIFICATION PROGRAM, BANGLADESH COUNCIL OF SCI. AND INDUS. RES. (BCSIR), DHAKA, BANGLADESH (2003).

J. D. Pfaff & D. P. Hautman, *Method 300.1: Determination of Inorganic Anions in Drinking Water by Ion Chromatography, Revision 1*, Nat'l Exposure Res. Lab., Off. of Res. & Dev., EPA, Cincinnati, Ohio 45268 (2007).

G. H. Rabbani, Double-Blind, Randomized. Placebo-Controlled Trial of Antioxidant Vitamins and Minerals in the Treatment of chronic Arsenic Poisoning in Bangladesh, Bangladesh Arsenic Control Soc'y Res. Group Final Rep. 2003 (sponsored by UNICEF and Gov't of Bangladesh).

Rapid Assessment of Arsenic Removal Technologies, Phase 1, Final Draft Rep., BAMWSP/DFID/Water Aid (2001).

S. B. Rasul et al., *Electrochemical Measurement and Specification of Inorganic Arsenic in Groundwater of Bangladesh*, 58 TALANTA 33-43 (2002).

Rep. on the Arsenic PT TC Project BGD/08/018, IAEA, Analytical Quality Control Servs., Agency's Labs., A-2444 Seibersdorf, Austria (2005).

W. D. Schecher & D. C. McAvoy, *MINEQL+: A Chemical Equilibrium Program for Personal Computers, User's Manual, Version* 4.0, Envtl. Res. Software, Hallowell, M E 04347 (1998).

Shaw Envtl. Inc., Final Rep.: Evaluation of Grainger Challenge Arsenic Treatment Sys.—SONO Filter #29. (2006) (prepared under EPA Contract No. EP-C-05-056 and Nat'l Acad. of Eng'g—Shaw PN 118205-03).

A. H. Smith et al., *Contamination of Drinking—Water by Arsenic in Bangladesh: A Public Health Emergency*, 78 BULLETIN OF THE WHO 1093-1103 (2000).

J. H. Stephen et al., *Solar Oxidation and Removal of Arsenic at Circumneutral pH in Iron Containing Water*, 35 ENVTL SCI. AND TECH. 2114-21 (2001).

W. A. Waychunas et al., *Surface Chemistry of Ferrihydrite, Part I: EXAFS Studies of Geometry of Coprecipitated and Adsorbed Arsenate*, 57 GEOCHIMICA ET COSMOCHIMICA ACTA 2251-70 (1993).

A. J. Wilkie & J. Herring, *Adsorption of Arsenic onto Hydrous Ferric Oxide: Effects of Adsorbate/Adsorbant Ratios and Co-occurring Solutes*, 107 COLLOID & SURFACES A: PHYSICOCHEM. ENG'G ASPECTS 97-110 (1986).

What is claimed is:

1. A porous iron composition comprising:
   a. an iron component of about 68% to about 92% iron by weight;
   b. a manganese component of about 0.2% to about 3% manganese by weight;
   c. a cerium component of at least 4 μg of cerium per gram of the iron composition;
   d. a carbon component of about 1% to about 5% carbon by weight;
   e. a phosphorous component of about 0.05% to about 2% phosphorous by weight;
   f. a sulfur component of about 300 μg of sulfur per gram of the iron composition to about 1000 μg of sulfur per gram of the iron composition;
   g. an aluminum component of at least 0.01% aluminum by weight;
   h. a silicon component of about 1% to about 2% silica by weight;
   i. a chromium component of about 300 μg of chromium per gram of the iron composition to about 500 μg of chromium per gram of the iron composition;
   j. a copper component of about 300 μg of copper per gram of the iron composition to about 600 μg of copper per gram of the iron composition; and
   k. a zinc component of about 8 μg of zinc per gram of the iron composition to about 20 μg of zinc per gram of the iron composition.

* * * * *